United States Patent
Houzumi et al.

(10) Patent No.: US 10,840,656 B2
(45) Date of Patent: Nov. 17, 2020

(54) BUS BAR UNIT AND ROTARY ELECTRIC MACHINE HAVING THE SAME

(71) Applicants: KYB Corporation, Tokyo (JP); TOP Co., Ltd., Echizen (JP)

(72) Inventors: Nobuji Houzumi, Kanagawa (JP); Kenji Sasaki, Fukui (JP); Yoshihiro Kodera, Fukui (JP)

(73) Assignee: TOP CO., LTD., Fukui (JP)

( * ) Notice: Subject to any disclaimer, the term of this patent is extended or adjusted under 35 U.S.C. 154(b) by 92 days.

(21) Appl. No.: 15/578,375

(22) PCT Filed: Jul. 22, 2015

(86) PCT No.: PCT/JP2015/070864
§ 371 (c)(1),
(2) Date: Nov. 30, 2017

(87) PCT Pub. No.: WO2017/013772
PCT Pub. Date: Jan. 26, 2017

(65) Prior Publication Data
US 2018/0175570 A1    Jun. 21, 2018

(51) Int. Cl.
| H01R 25/16 | (2006.01) |
| H02K 3/38 | (2006.01) |
| H02K 3/50 | (2006.01) |
| H02K 3/28 | (2006.01) |
| H02K 3/52 | (2006.01) |

(52) U.S. Cl.
CPC ............. *H01R 25/161* (2013.01); *H02K 3/28* (2013.01); *H02K 3/38* (2013.01); *H02K 3/50* (2013.01); *H02K 3/521* (2013.01)

(58) Field of Classification Search
CPC . H02K 3/521; H02K 3/50; H02K 3/38; H01R 25/161; H01R 25/162; H01R 25/16
USPC ................... 310/71; 439/118, 298, 332, 314
See application file for complete search history.

(56) References Cited

U.S. PATENT DOCUMENTS

| 4,025,216 A * | 5/1977 | Hives ...................... F16B 12/26 |
| | | 403/381 |
| 4,530,136 A * | 7/1985 | Konkle .................... A47B 1/00 |
| | | 24/608 |
| 2002/0047365 A1* | 4/2002 | Yagyu ...................... H02K 3/50 |
| | | 310/71 |

(Continued)

FOREIGN PATENT DOCUMENTS

| EP | 1191665 A1 | 3/2002 | |
| JP | 56088638 A * | 7/1981 | ............... H02K 3/50 |

(Continued)

OTHER PUBLICATIONS

Hoshaku (JP 2015122880 A) English Translation. (Year: 2015).*
Nozawa (JP-2018074830-A) English Translation (Year: 2018).*
Tanajiri (JP 56088638 A) English Translation (Year: 1981).*

*Primary Examiner* — Tulsidas C Patel
*Assistant Examiner* — Robert E Mates
(74) *Attorney, Agent, or Firm* — Rabin & Berdo, P.C.

(57) ABSTRACT

A bus bar unit includes a bus bar for energizing a coil wound around a stator; and a bus bar holder formed by an insulating member and holds the bus bar. The bus bar holder includes an engaged part which is configured to be engaged with an engaging part formed at an extending part extended from the stator in axial direction of the stator.

2 Claims, 10 Drawing Sheets

(56) References Cited

U.S. PATENT DOCUMENTS

| | | | | |
|---|---|---|---|---|
| 2003/0020344 | A1* | 1/2003 | Futami | H01R 4/2458 |
| | | | | 310/71 |
| 2006/0071566 | A1* | 4/2006 | Ha | H02K 5/08 |
| | | | | 310/89 |
| 2007/0273221 | A1* | 11/2007 | Kinoshita | H02K 3/50 |
| | | | | 310/58 |
| 2012/0293024 | A1* | 11/2012 | Yokogawa | H02K 1/278 |
| | | | | 310/43 |
| 2014/0028127 | A1* | 1/2014 | Chamberlin | H02K 3/522 |
| | | | | 310/71 |
| 2015/0137637 | A1* | 5/2015 | Jang | H02K 3/522 |
| | | | | 310/71 |
| 2015/0357877 | A1* | 12/2015 | Bessho | H02K 5/225 |
| | | | | 310/71 |

FOREIGN PATENT DOCUMENTS

| | | | | |
|---|---|---|---|---|
| JP | 2004-194367 | A | | 7/2004 |
| JP | 2008-187875 | A | | 8/2008 |
| JP | 2009-124926 | A | | 6/2009 |
| JP | 2010-148175 | A | | 7/2010 |
| JP | 2013-212008 | A | | 10/2013 |
| JP | 2014-107988 | A | | 6/2014 |
| JP | 2015122880 | A | * | 7/2015 |
| JP | 2018074830 | A | * | 5/2018 |
| WO | WO-2014174666 | A1 | * | 10/2014 ............. H02K 5/225 |

* cited by examiner

BUS BAR UNIT AND ROTARY ELECTRIC MACHINE HAVING THE SAME

TECHNICAL FIELD

The present invention relates to a bus bar unit and a rotary electric machine having the same.

BACKGROUND ART

JP2013-212008A discloses a bus bar unit that supplies a current from a terminal part to coils of respective phases of a stator. This bus bar unit is provided with a plurality of bus bars that supply a current to the respective coils of the stator, and a bus bar base that holds the bus bars with spaces therebetween in the radial direction of the stator.

The bus bar base includes an annular main body part that has annular grooves for receiving the plurality of bus bars, and a plurality of extending parts that are extended from the outer peripheral end of the main body part and that have engaging protrusion parts at the tip ends thereof. The bus bar unit is attached to the stator as the engaging protrusion parts of the extending parts engage, by snap-fitting, with an engaging recessed part on the side of the stator.

SUMMARY OF INVENTION

According to the above-described conventional art, the extending parts, on which the engaging protrusion parts are formed, are provided on the side of the bus bar unit, and thus, the extending parts are set to have the larger diameter than that of the bus bar base, according to the outer diameter of the member on the side of the stator, with which the engagement by the snap-fitting is made. Thereby, the radial dimension of the bus bar unit increases.

It is an object of the present invention to provide a bus bar unit that can reduce the radial dimension, and a rotary electric machine having the same.

According to one aspect of the present invention, a bus bar unit includes: a bus bar for energizing a coil wound around a stator; and a bus bar holder formed by an insulating member, the bus bar holder being configured to hold the bus bar. The bus bar holder includes an engaged part which is configured to be engaged with an engaging part formed at an extending part extended from the stator in axial direction of the stator.

According to another aspect of the present invention, a bus bar unit includes a bus bar for energizing a coil wound around a stator; and a bus bar holder, formed by an insulating member, for holding the bus bar. The bus bar holder includes an extending part extended toward the stator in axial direction of the stator, and an engaging part formed to protrude from the extending part in circumferential direction of the stator, and engaged with an engaged part of the stator.

DESCRIPTION OF EMBODIMENTS

Hereinafter, embodiments of the present invention will be explained with reference to the attached drawings.

First, a first embodiment will be explained.

Figure 1:
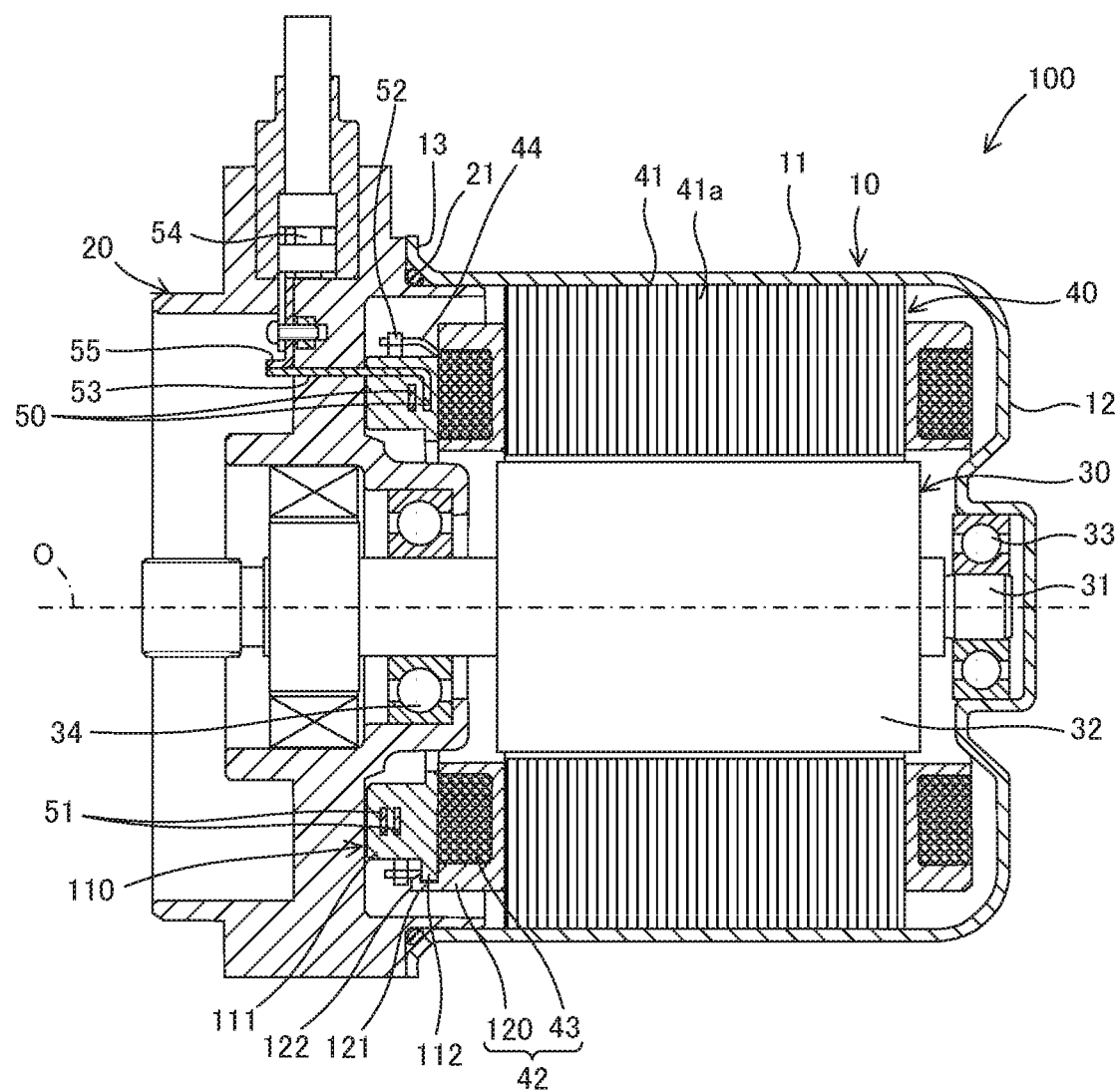
FIG. 1 is a cross-sectional view of a motor having a bus bar unit according to a first embodiment of the present invention.
Figure 2:
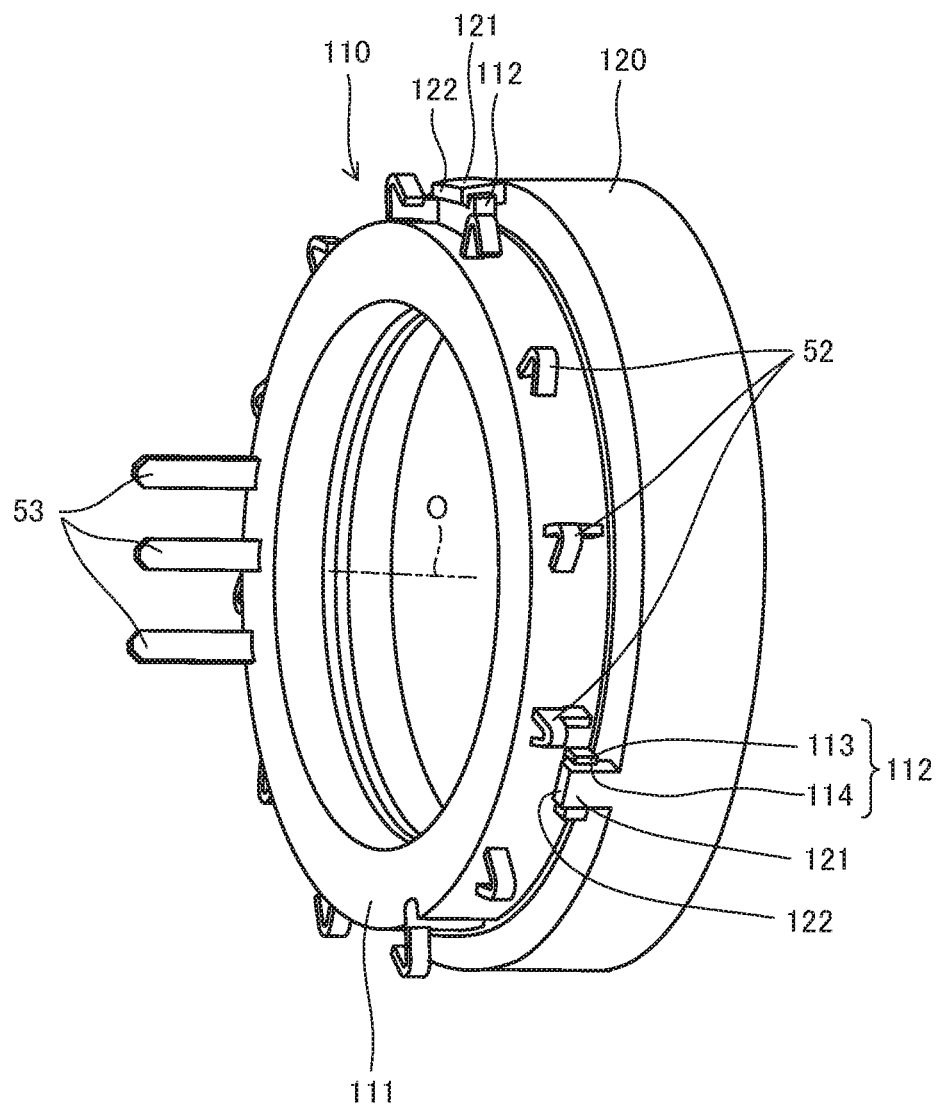
FIG. 2 is a perspective view of the bus bar unit according to the first embodiment of the present invention.

FIG. 1 is a cross-sectional view of a motor 100 on which a bus bar unit 110 according to this embodiment is mounted. FIG. 2 is a perspective view of the bus bar unit 110 according to this embodiment. It should be noted that, in the following explanation, the direction of a rotation axis of the motor 100 is referred to as the "axial direction", the radiation direction about the rotation axis of the motor 100 is referred to as the "radial direction", and the direction about the rotation axis of the motor 100 is referred to as the "circumferential direction".

The motor 100, as a rotary electric machine, is a three-phase (U-phase, V-phase, W-phase) AC motor, and is used for an electric power steering system or the like of a vehicle, for example. The motor 100 is provided with a motor case 10 that is made of metal, a motor cover 20 that is formed by an insulating resin material and that is provided to cover an opening part of the motor case 10, a rotor 30 that is received in the motor case 10 and that is pivotally supported by the motor case 10 and the motor cover 20 to be able to rotate, and a stator 40 that is provided on the inner peripheral surface of the motor case 10 and that is arranged with a predetermined space between itself and the outer periphery of the rotor 30.

The motor case 10 includes a tube part 11 that has a cylindrical shape, a bottom part 12 that closes one end of the tube part 11, and an opening end part 13 that has an annular shape and that is formed around an opening part opening at the other end of the tube part 11.

The motor cover 20 is engaged to the opening end part 13 of the motor case 10 by a plurality of bolts (not illustrated). Sealing between the motor cover 20 and the motor case 10 is provided by a seal ring 21.

The rotor 30 includes a rotor shaft 31 that is rotatably supported by the motor case 10, and a rotor core 32 that has the rotor shaft 31 inserted therethrough in the axial direction and that receives a plurality of magnets (permanent magnets) arranged at predetermined intervals in the circumferential direction.

One end side of the rotor shaft 31 is supported by the bottom part 12 of the motor case 10 via a bearing 33, and the other end side thereof is supported by the motor cover 20 via a bearing 34. Thus, the rotor 30 is rotatably supported about a central axis O.

The stator 40 includes a stator core 41 that is provided inside the motor case 10, and a plurality of stator coils 42 that are provided on the stator core 41 at predetermined intervals along the circumferential direction.

The stator core 41 is formed by a magnetic material, and is formed by laminating a plurality of steel plates in the axial direction, the steel plates having a plurality of teeth parts 41a radially extending in the radial direction. The stator core 41 is fixed to the motor case 10 as its outer periphery is fitted to the inner periphery of the motor case 10.

The stator coils 42 are formed by a plurality of insulators 120 that are formed by an insulating resin material surrounding the respective teeth parts 41a of the stator core 41, and a plurality of electromagnetic coils 43 that serve as coils formed by wires wound around the teeth parts 41a via the insulators 120. The end part of a wire 44 of each electromagnetic coil 43 is pulled out from a space between the bus bar unit 110 and the insulator 120 to the outside of the stator coil 42.

The motor 100 further includes the bus bar unit 110 that is provided next to the stator coils 42 in the axial direction.

The bus bar unit 110 includes a plurality of bus bars 50 that are formed by a conductive material energizing the electromagnetic coils 43 wound around the stator 40, and a bus bar holder 111 that is formed by an insulating resin material and that holds the bus bars 50 in its inside.

The bus bar holder 111 is formed by insert molding by using the insulating resin material. Namely, at the time of manufacturing the bus bar unit 110, the respective bus bars 50 are disposed in a mold (not illustrated), and thereafter the insulating resin material is injected into the mold, so as to form the bus bar holder 111. Inside the bus bar holder 111, the respective bus bars 50 are held with spaces therebetween in the axial direction or in the radial direction.

The plurality of bus bars 50 are formed by four bus bars 50 respectively corresponding to the U-phase, the V-phase, the W-phase and a neutral point. Each bus bar 50, having a plate shape and corresponding to each phase, includes an arc-shaped conductive part 51 that extends in an arc shape about the central axis O, a plurality of feeding terminals 52 that are provided to protrude in the radial direction from the arc-shaped conductive part 51, and one bus bar terminal 53 that is provided to protrude in the axial direction from the arc-shaped conductive part 51.

The plurality of feeding terminals 52, corresponding to the respective phases, protrude from the outer periphery of the bus bar holder 111. Three bus bar terminals 53 that are connected to an AC power supply protrude from one end of the bus bar holder 111.

The bus bar holder 111 includes positioning step parts 112, each of which has a block shape, serves as an engaged part, and protrudes from the outer peripheral surface. Three positioning step parts 112 are arranged at almost equal intervals in the circumferential direction along the outer peripheral surface of the bus bar holder 111. The positioning step parts 112 are formed integrally with the bus bar holder 111 by a resin material, at the time of molding the bus bar holder 111. Incidentally, the number of the positioning step parts 112 is not limited to three, and three or more positioning step parts 112 may be provided.

Each positioning step part 112 is provided to offset, in the circumferential direction, from each feeding terminal 52 of the bus bar 50, so as not to overlap, in the axial direction, the feeding terminal 52 of the bus bar 50. Thereby, interference between the wires 44, extending from the electromagnetic coils 43 and being connected to the feeding terminals 52 of the bus bars 50, and the positioning step parts 112 can be avoided.

The outer peripheral surface of each positioning step part 112 is formed by a raised part 113 that is raised and located on both sides in the circumferential direction, and a recessed part 114 that is arranged in the raised part 113 and is recessed from the raised part 113.

The insulator 120 includes extending parts 121, each of which is extended in the axial direction from the outer peripheral end of the end surface in the axial direction on the side of the bus bar unit 110 toward the bus bar unit 110. Three extending parts 121 are arranged at almost equal intervals along the circumferential direction, so as to be able to engage with the positioning step parts 112 of the bus bar holder 111. The width in the circumferential direction of each extending part 121 is set to be almost equal to the width of each recessed part 114 of each positioning step part 112. The outer peripheral surface of each extending part 121 is extended, without a step, from the outer peripheral surface of the insulator 120. A claw part 122 that protrudes toward the inner periphery side of each extending part 121 and that serves as an engaging part is formed at the tip of each extending part 121.

The bus bar holder 111 is positioned with respect to the stator coils 42 as the plurality of extending parts 121 of the insulator 120 engage with the positioning step parts 112 by snap-fitting. Namely, the extending parts 121 are fitted to the recessed parts 114 of the positioning step parts 112, and the claw parts 122 are locked on the positioning step parts 112, so that the bus bar holder 111 is positioned with respect to the stator coils 42 in the radial direction and in the circumferential direction. Thereby, the bus bar holder 111 is arranged coaxially with the stator coils 42, and held at the predetermined rotational position.

Upon assembly of the motor 100, the stator coils 42 are assembled to the stator core 41, and thereafter, the bus bar unit 110 is assembled to the stator coils 42. At this time, the wire 44 of each electromagnetic coil 43 is extended from a space between the opening end of the insulator 120 and the outer peripheral end of the bus bar holder 111, and its tip end part is welded to the feeding terminal 52 of each bus bar 50.

Next, the stator 40 is assembled to the motor case 10, and thereafter, the motor cover 20 is assembled to the motor case 10. At this time, the three bus bar terminals 53 that protrude from one end of the bus bar holder 111 penetrate through the respective holes of the motor cover 20.

Terminals 55 that are connected to electric wires 54, corresponding to the respective phases, are provided on the motor cover 20. The motor cover 20 is engaged to the motor case 10, and thereafter, the bus bar terminals 53 are welded to one ends of the terminals 55.

When the motor 100 is operating, a driving current is supplied to the respective electromagnetic coils 43 via the electric wires 54, the terminals 55, and the bus bars 50, and the rotor 30 is rotated by magnetic force generated in the stator core 41.

The following effects can be obtained by the above-described embodiment.

The bus bar holder 111 is attached to the insulator 120 as the positioning step parts 112, provided on the outer peripheral surface of the bus bar holder 111, engage by the snap-fitting with the extending parts 121, extended in the axial direction from the insulator 120. This eliminates the need for providing the extending parts 121 on the bus bar holder 111. Thereby, it is possible to reduce the diameter of the bus bar holder 111 as compared with the case where the extending parts 121 are provided on the bus bar holder 111 and engaged by the snap-fitting with the outer peripheral surface of the insulator 120. This makes it possible to reduce the radial dimension of the bus bar unit 110.

Next, a second embodiment will be explained.

Figure 3:
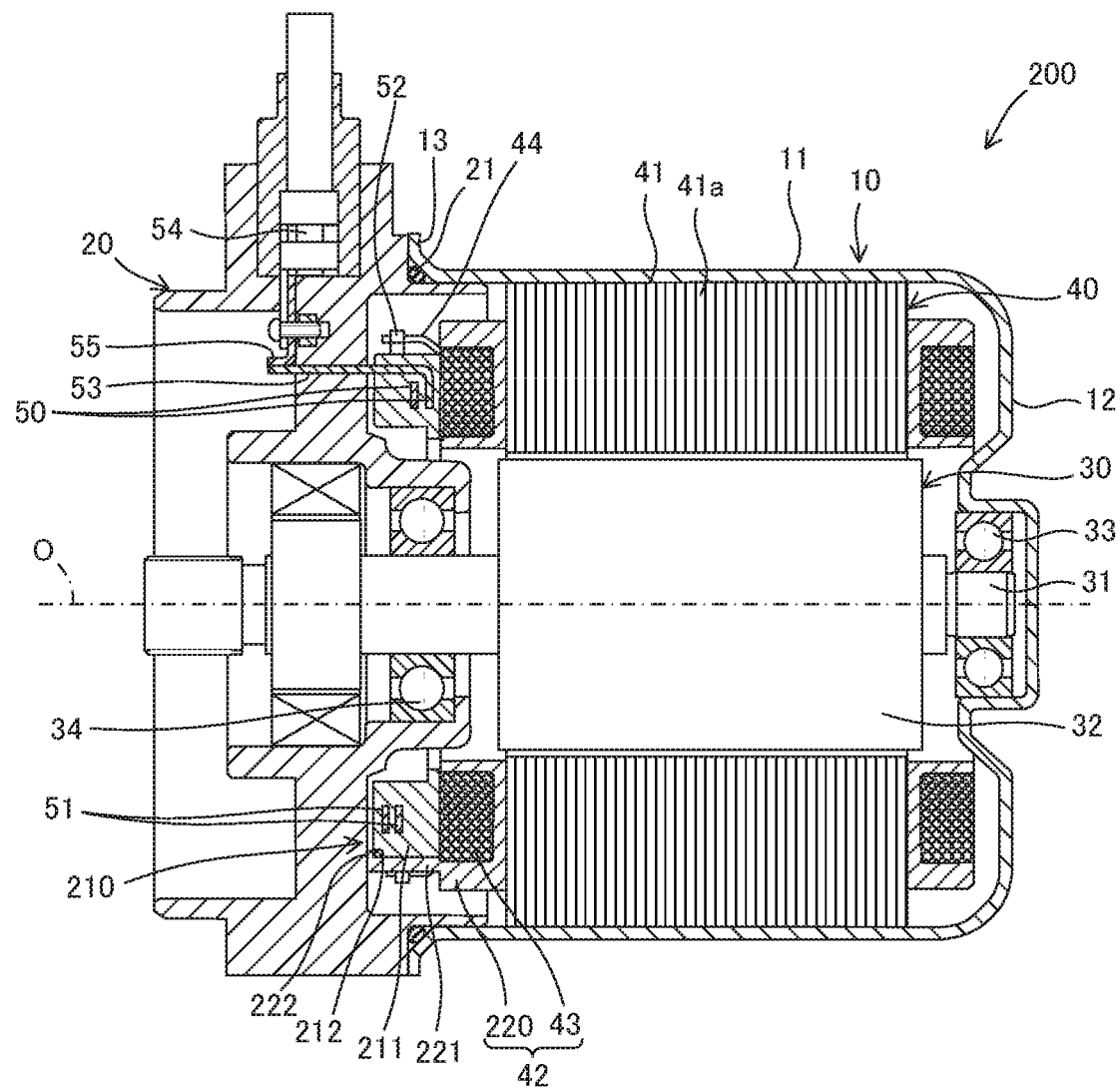
FIG. 3 is a cross-sectional view of a motor having a bus bar unit according to a second embodiment of the present invention.
Figure 4:
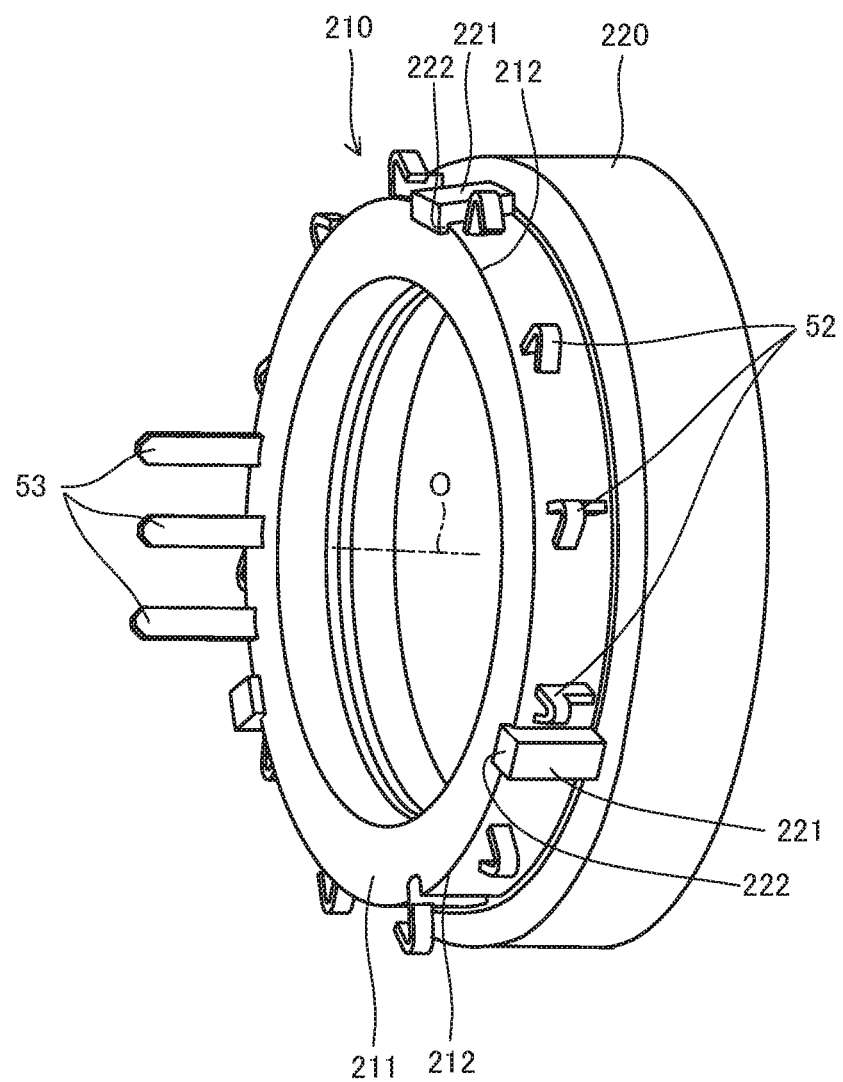
FIG. 4 is a perspective view of the bus bar unit according to the second embodiment of the present invention.

FIG. 3 is a cross-sectional view of a motor 200 on which a bus bar unit 210 according to this embodiment is mounted. FIG. 4 is a perspective view of the bus bar unit 210 according to this embodiment. In the following explanation, differences from the first embodiment are mainly explained, same reference numerals and symbols are given to designate the same structures as those of the motor 100 according to the first embodiment, and explanations thereof are omitted.

This embodiment is different from the first embodiment in the structure of engaging a bus bar holder 211 and an insulator 220.

The bus bar holder 211 according to this embodiment does not include the positioning step parts 112 of the first embodiment. The insulator 220 includes extending parts 221 that are extended, in the axial direction, from the end surface in the axial direction on the side of the bus bar unit 210 and from the outer peripheral side from the electromagnetic coils 43, toward the bus bar unit 210. Three extending parts 221 are arranged at almost equal intervals along the circumferential direction. A protrusion part 222 that protrudes toward the inner peripheral side of each extending part 221 and that serves as an engaging part is formed at the tip of each extending part 221. The axial dimension of each extending part 221, from the insulator 220 to the protrusion part 222, is set to be almost equal to the axial dimension of the bus bar holder 211.

The bus bar holder 211 is positioned with respect to the stator coils 42, as the plurality of extending parts 221 of the insulator 220 engage by the snap-fitting with a corner part 212 that serves as an engaged part at the position where the end surface of the bus bar holder 211, on the side opposite to the insulator 220 in the axial direction, crosses the outer peripheral surface of the bus bar holder 211. Namely, the protrusion parts 222 of the extending parts 221 engage with the corner part 212 of the bus bar holder 211, with the bus bar holder 211 abutting against the insulator 220, so that the bus bar holder 211 is positioned, in the radial direction, with respect to the stator coils 42. Thereby, the bus bar holder 211 is arranged coaxially with the stator coils 42.

Although this embodiment does not have the structure of positioning the bus bar holder 211 in the circumferential direction, a plurality of raised parts may be provided on the corner part 212 of the bus bar holder 211, for example, and the protrusion parts 222 of the extending parts 221 may be fitted between the raised parts. Thereby, the bus bar holder 211 can be positioned in the circumferential direction, and held at the predetermined rotational position.

The following effects can be obtained by the above-described embodiment.

The bus bar holder 211 is attached to the insulator 220 as the protrusion parts 222 of the extending parts 221, extended in the axial direction from the insulator 220, engage by the snap-fitting with the corner part 212 of the bus bar holder 211. This eliminates the need for providing the extending parts 221 on the bus bar holder 211. Thereby, it is possible to reduce the diameter of the bus bar holder 211 as compared with the case where the extending parts 221 are provided on the bus bar holder 211 and engaged by the snap-fitting with the outer peripheral surface of the insulator 220. This makes it possible to reduce the radial dimension of the bus bar unit 210.

As the protrusion parts 222 of the extending parts 221, extended in the axial direction from the insulator 220, engage by the snap-fitting with the corner part 212 of the bus bar holder 211, the bus bar holder 211 does not need a special structure for the engagement of the bus bar holder 211 and the insulator 220. This makes it possible to simplify the shape of the mold for molding the bus bar holder 211, to facilitate molding of the resin, to reduce manufacturing costs of the bus bar holder 211, and to improve the quality.

Next, a third embodiment will be explained.

Figure 5:
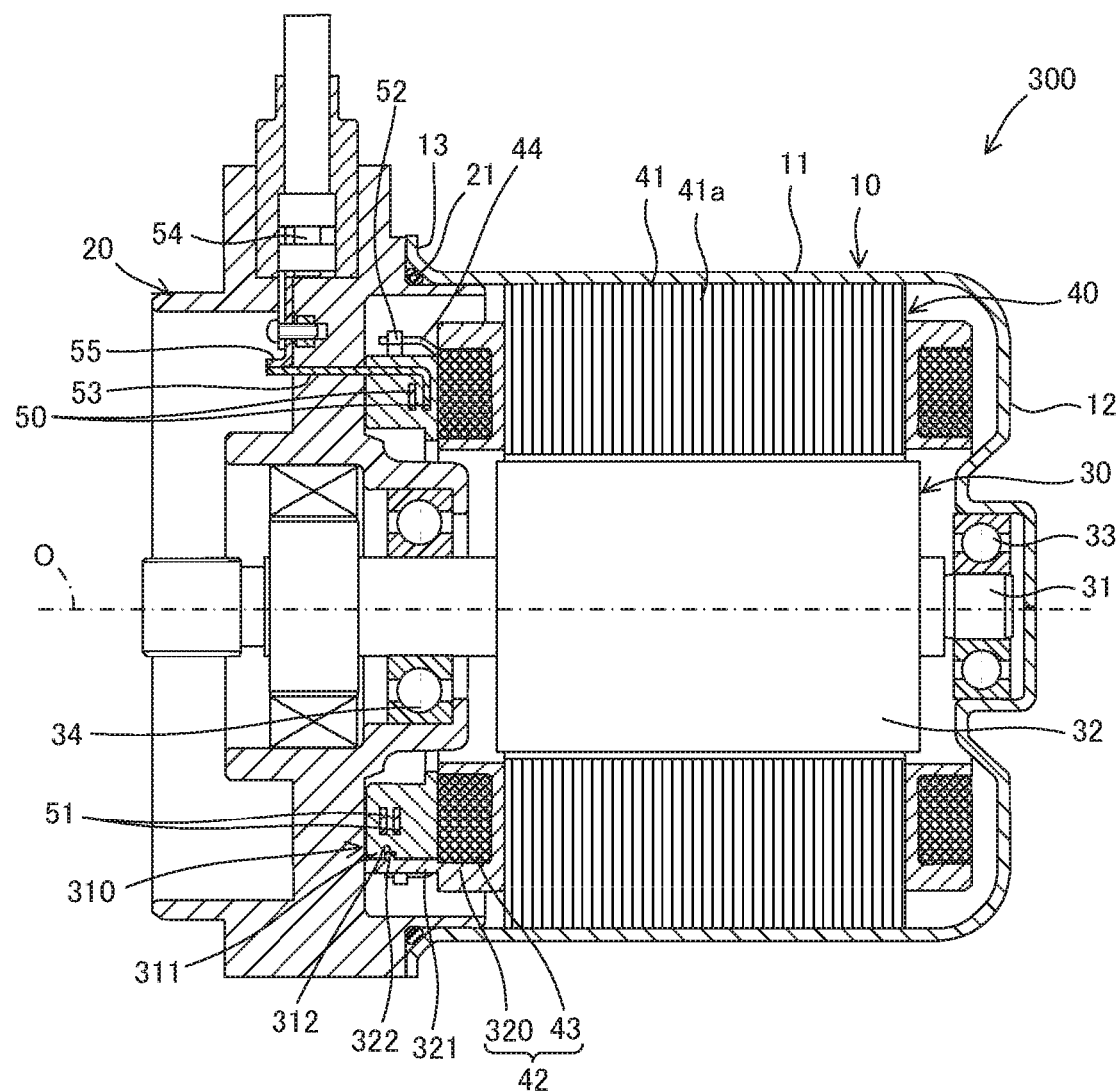
FIG. 5 is a cross-sectional view of a motor having a bus bar unit according to a third embodiment of the present invention.
Figure 6:
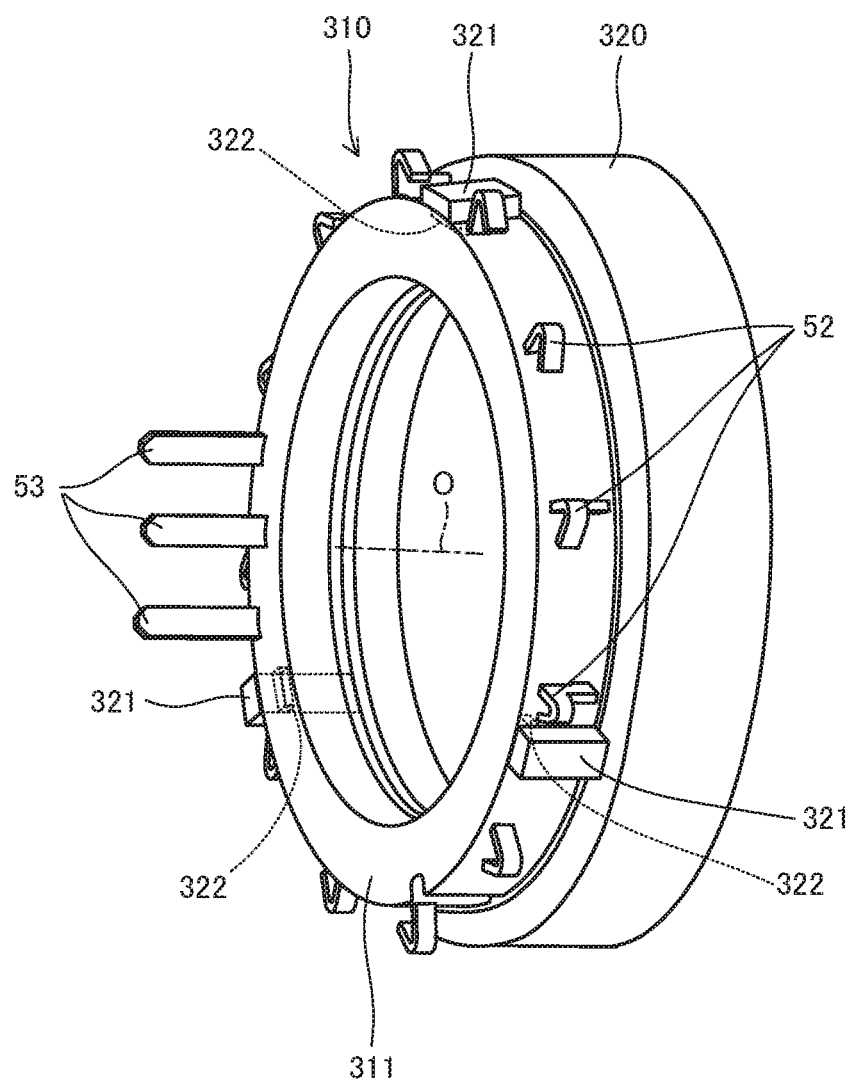
FIG. 6 is a perspective view of the bus bar unit according to the third embodiment of the present invention.

FIG. 5 is a cross-sectional view of a motor 300 on which a bus bar unit 310 according to this embodiment is mounted. FIG. 6 is a perspective view of the bus bar unit 310 according to this embodiment. In the following explanation, differences from the first embodiment are mainly explained, same reference numerals and symbols are given to designate the same structures as those of the motor 100 according to the first embodiment, and explanations thereof are omitted.

This embodiment is different from the first embodiment in the structure of engaging a bus bar holder 311 and an insulator 320.

The bus bar holder 311 according to this embodiment includes, in its outer peripheral surface, recessed parts 312 that serve as engaged parts, instead of the positioning step parts 112 of the first embodiment. Three recessed parts 312 are arranged, in the circumferential direction, at almost equal intervals along the outer peripheral surface of the bus bar holder 311. Incidentally, the number of the recessed parts 312 is not limited to three, and three or more recessed parts 312 may be provided.

The insulator 320 includes extending parts 321, each of which is extended in the axial direction from the end surface in the axial direction on the side of the bus bar unit 310 and from the outer peripheral side from the electromagnetic coils 43, toward the bus bar unit 310. Three extending parts 321 are arranged at almost equal intervals along the circumferential direction, so as to correspond to the recessed parts 312 of the bus bar holder 311. The axial dimension of each extending part 321 is set to be almost equal to the axial dimension of the bus bar holder 311. A protrusion part 322 that protrudes toward the inner peripheral side of each extending part 321 and that serves as an engaging part is formed on the inner peripheral surface of each extending part 321. The protrusion part 322 is set to have such a dimension that can be engaged with each recessed part 312 of the bus bar holder 311.

The bus bar holder 311 is positioned with respect to the stator coils 42, as the plurality of extending parts 321 of the insulator 320 engage by the snap-fitting with the recessed parts 312. Namely, the protrusion parts 322 of the extending parts 321 are fitted to the recessed parts 312, so that the bus bar holder 311 is positioned, in the radial direction and in the circumferential direction, with respect to the stator coils 42. Thereby, the bus bar holder 311 is arranged coaxially with the stator coils 42, and held at the predetermined rotational position.

The following effects can be obtained by the above-described embodiment.

The bus bar holder 311 is attached to the insulator 320 as the recessed parts 312, provided in the outer peripheral surface of the bus bar holder 311, engage by the snap-fitting with the protrusion parts 322 of the extending parts 321, extended in the axial direction from the insulator 320. This eliminates the need for providing the extending parts 321 on the bus bar holder 311. Thereby, it is possible to reduce the diameter of the bus bar holder 311 as compared with the case where the extending parts 321 are provided on the bus bar holder 311 and engaged by the snap-fitting with the outer peripheral surface of the insulator 320. This makes it possible to reduce the radial dimension of the bus bar unit 310.

As the tips of the extending parts 321 of the insulator 320 do not protrude from the end surface of the bus bar holder 311 on the side of the motor cover toward the side of the motor cover 20, it is possible to increase a contact area between bus bar unit 310 and the motor cover 20, when the bus bar unit 310 is received inside the motor case 10 and the motor cover 20 is assembled to the motor case 10. This makes it possible to prevent rattling of the bus bar unit 310 with more reliability, as compared with the case where the bus bar unit 310 makes contact at the three positions in the circumferential direction, as in the second embodiment.

Next, a fourth embodiment will be explained.

Figure 7:
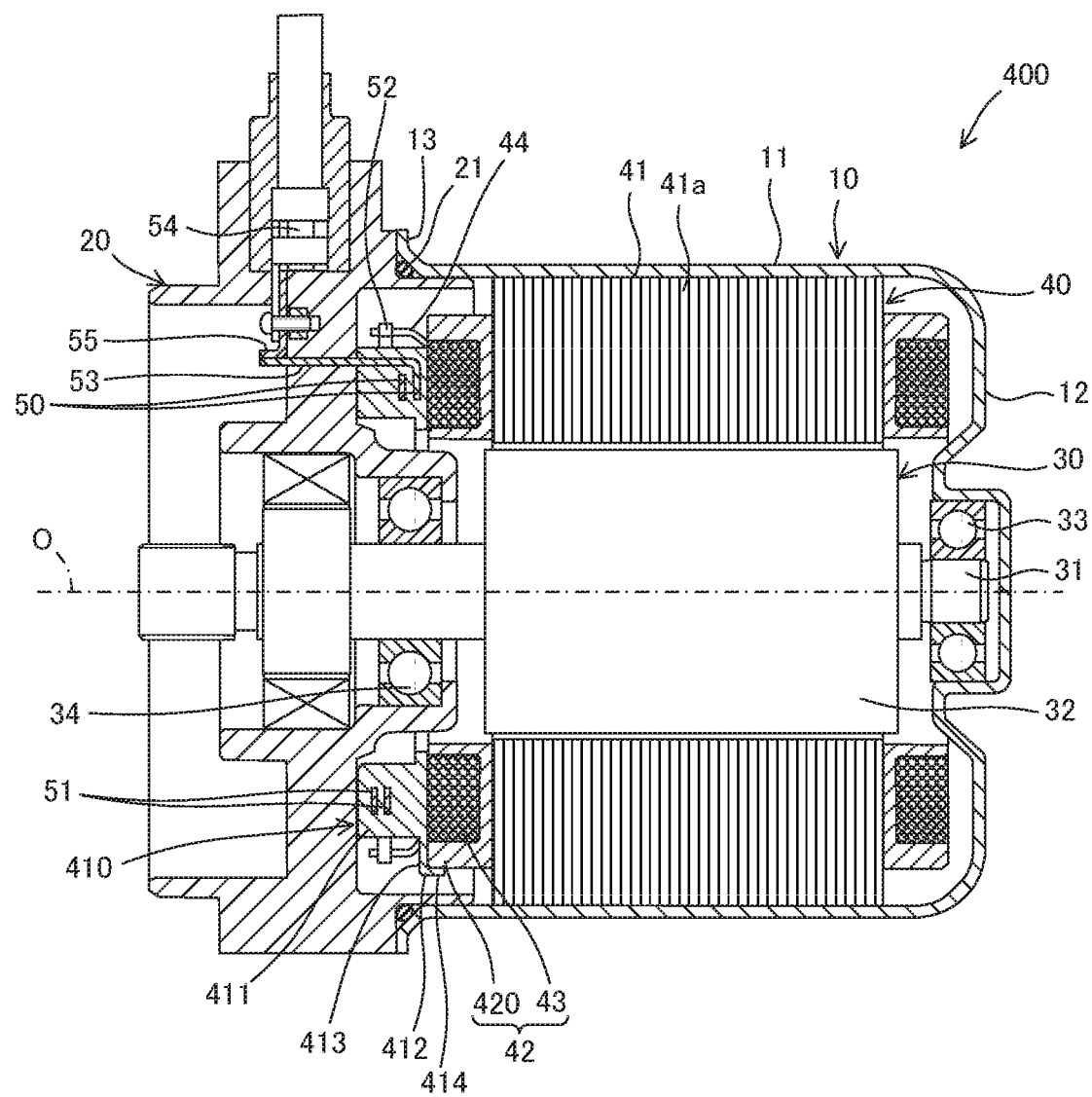
FIG. 7 is a cross-sectional view of a motor having a bus bar unit according to a fourth embodiment of the present invention.
Figure 8:
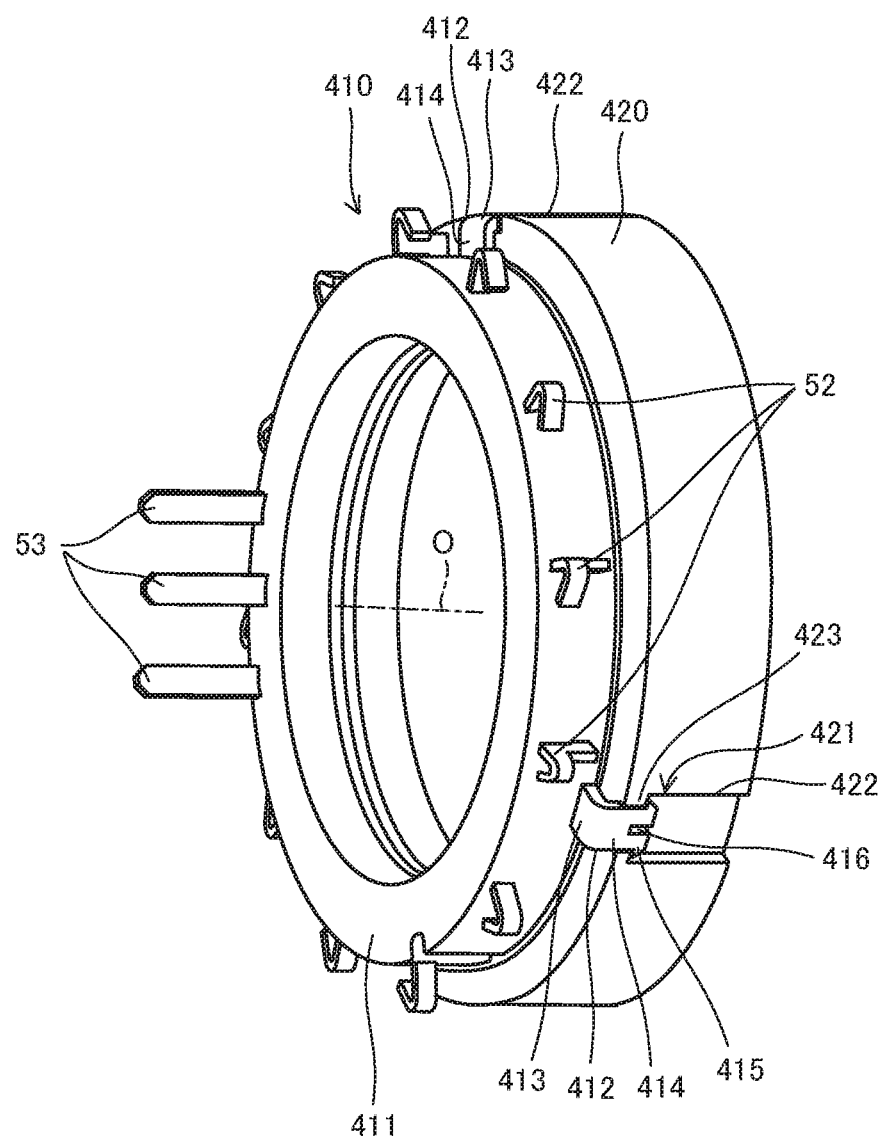
FIG. 8 is a perspective view of the bus bar unit according to the fourth embodiment of the present invention.

FIG. 7 is a cross-sectional view of a motor 400 on which a bus bar unit 410 according to this embodiment is mounted. FIG. 8 is a perspective view of the bus bar unit 410 according to this embodiment.

This embodiment is different from the first embodiment in the structure of engaging a bus bar holder 411 and an insulator 420. It should be noted that, in the following explanation, the direction of the rotation axis of the motor 400 is referred to as the "axial direction", the radiation direction about the rotation axis of the motor 400 is referred to as the "radial direction", and the direction about the rotation axis of the motor 400 is referred to as the "circumferential direction".

The motor 400 is the three-phase (the U-phase, the V-phase, the W-phase) AC motor, and is used for the electric power steering system or the like of the vehicle, for example. The motor 400 is provided with the motor case 10 that is made of metal, the motor cover 20 that is formed by an insulating resin material and that is provided to cover the opening part of the motor case 10, the rotor 30 that is received in the motor case 10 and that is pivotally supported by the motor case 10 and the motor cover 20 to be able to rotate, and the stator 40 that is provided on the inner peripheral surface of the motor case 10 and that is arranged with a predetermined space between itself and the outer periphery of the rotor 30.

The motor case 10 includes the tube part 11 that has a cylindrical shape, the bottom part 12 that closes one end of the tube part 11, and the opening end part 13 that has an annular shape and that is formed around the opening part opening at the other end of the tube part 11.

The motor cover 20 is engaged to the opening end part 13 of the motor case 10 by a plurality of bolts (not illustrated). Sealing between the motor cover 20 and the motor case 10 is provided by the seal ring 21.

The rotor 30 includes the rotor shaft 31 that is rotatably supported by the motor case 10, and the rotor core 32 that has the rotor shaft 31 inserted therethrough in the axial direction and that receives a plurality of magnets (permanent magnets) arranged at predetermined intervals in the circumferential direction.

One end side of the rotor shaft 31 is supported by the bottom part 12 of the motor case 10 via a bearing, and the other end side thereof is supported by the motor cover 20 via a bearing. Thus, the rotor 30 is rotatably supported about the central axis O.

The stator 40 includes the stator core 41 that is provided inside the motor case 10, and the plurality of stator coils 42 that are provided on the stator core 41 at predetermined intervals along the circumferential direction.

The stator core 41 is formed by a magnetic material, and is formed by laminating the plurality of steel plates in the axial direction, the steel plates having the plurality of teeth parts 41a radially extending in the radial direction. The stator core 41 is fixed to the motor case 10 as its outer periphery is fitted to the inner periphery of the motor case 10.

The stator coils 42 are formed by the plurality of insulators 420 that are formed by an insulating resin material surrounding the respective teeth parts 41a of the stator core 41, and the plurality of electromagnetic coils 43 that are formed by the wires 44 wound around the teeth parts 41a via the insulators 420. The end part of the wire 44 of each electromagnetic coil 43 is pulled out from a space between the bus bar unit 410 and the insulator 420 to the outside of the stator coil 42.

The motor 400 further includes the bus bar unit 410 that is provided next to the stator coils 42 in the axial direction.

The bus bar unit 410 includes the plurality of bus bars 50 that are formed by a conductive material energizing the electromagnetic coils 43 wound around the stator 40, and the bus bar holder 411 that is formed by an insulating resin material and that holds the bus bars 50 in its inside.

The bus bar holder 411 is formed by insert molding by using the insulating resin material. Namely, at the time of manufacturing the bus bar unit 410, the respective bus bars 50 are disposed in a mold (not illustrated), and thereafter the insulating resin material is injected into the mold, so as to form the bus bar holder 411. Inside the bus bar holder 411, the respective bus bars 50 are held with spaces therebetween in the axial direction or in the radial direction.

The plurality of bus bars 50 are formed by four bus bars 50 respectively corresponding to the U-phase, the V-phase, the W-phase and the neutral point. Each bus bar 50, having a plate shape and corresponding to each phase, includes the arc-shaped conductive part 51 that extends in an arc shape about the central axis O, the plurality of feeding terminals 52 that are provided to protrude in the radial direction from the arc-shaped conductive part 51, and one bus bar terminal 53 that is provided to protrude in the axial direction from the arc-shaped conductive part 51. The plate-shaped bus bar 50, corresponding to the neutral point, includes the arc-shaped conductive part 51 that extends in an arc shape about the central axis O, and the plurality of feeding terminals 52 that are provided to protrude in the radial direction from the arc-shaped conductive part 51 and that connect the electromagnetic coils 43 of the respective phases.

The plurality of feeding terminals 52, corresponding to the respective phases, protrude from the outer periphery of the bus bar holder 411. Three bus bar terminals 53 that are connected to an AC power supply protrude from one end of the bus bar holder 411.

The bus bar holder 411 includes extending parts 412 that protrude from its outer peripheral surface and that engage with the outer peripheral surfaces of the stator coils 42. Three extending parts 412 are arranged, in the circumferential direction, at almost equal intervals along the outer peripheral surface of the bus bar holder 411. The extending parts 412 are formed integrally with the bus bar holder 411 by a resin material, at the time of molding the bus bar holder 411. Incidentally, the number of the extending parts 412 is not limited to three, and three or more extending parts 412 may be provided.

Each extending part 412 is provided to offset, in the circumferential direction, from each feeding terminal 52 of the bus bar 50, so as not to overlap, in the axial direction, the feeding terminal 52 of the bus bar 50. Thereby, interference between the wires 44, extending from the electromagnetic coils 43 and being connected to the feeding terminals 52 of the bus bars 50, and the extending parts 412 can be avoided.

Each extending part 412 includes a base end part 413 that protrudes in the radial direction from the outer peripheral surface, and a tip end part 414 that bends from the base end part 413 and extends, in the axial direction, toward the side of the stator coil 42. The base end part 413 of the extending part 412 is extended, without a step, from the end surface of the bus bar holder 411 on the side of the stator coil 42, and is abutted against the end surface of the insulator 420 on the side of the bus bar unit. The tip end part 414 of the extending part 412 bends from the tip of the base end part 413 and engages with an engaged part 421 that is formed on the outer periphery of the insulator 420.

On the tip end part 414 of each extending part 412, claw parts 415 that serves as an engaging part and that is formed to protrude on both sides in the circumferential direction, and a notch 416 that is formed between the claw parts 415 at the tip of the tip end part 414 are provided. The bus bar holder 411 engages with the stator coils 42 as the tip end parts 414 of the plurality of extending parts 412 engage with the engaged parts 421 on the outer periphery of the insulator 420.

The engaged parts 421, with which the tip end parts 414 of the extending parts 412 engage, are formed in the outer periphery of the insulator 420. Three engaged parts 421 are arranged at almost equal intervals along the circumferential direction, for the engagement of the tip end parts 414 of the extending parts 412. Each engaged part 421 includes a recessed part 422 that is formed to be recessed from the outer peripheral surface of the insulator 420, and a locking part 423 that is formed on the recessed part 422 on the side of the bus bar holder 411 and that has the smaller width, in the circumferential direction, than that of the recessed part 422. The width in the circumferential direction of the locking part 423 is set to be almost equal to the width of the tip end part 414 of the extending part 412, and to be smaller than the width of the position where the claw part 415 is formed.

The bus bar holder 411 is positioned with respect to the stator coils 42 as the tip end parts 414 of the extending parts 412 engage by the snap-fitting with the locking parts 423. At this time, the claw part 415 of the tip end part 414 of each extending part 412 moves in the axial direction while being bent toward the side of the notch 416, so that the claw part 415 passes over the locking part 423 in the axial direction. Namely, the tip end parts 414 of the extending parts 412 are fitted to the locking parts 423, and the claw parts 415 are locked on the locking parts 423, so that the bus bar holder 411 is positioned, in the radial direction and the circumferential direction, with respect to the stator coils 42. Thereby, the bus bar holder 411 is arranged coaxially with the stator coils 42, and held at the predetermined rotational position.

Upon assembly of the motor 400, the stator coils 42 are assembled to the stator core 41, and thereafter, the bus bar unit 410 is assembled to the stator coils 42. At this time, the wire 44 of each electromagnetic coil 43 is extended from a space between the opening end of the insulator 420 and the outer peripheral end of the bus bar holder 411, and its tip end part 414 is welded to the feeding terminal 52 of each bus bar 50.

Next, the stator 40 is assembled to the motor case 10, and thereafter, the motor cover 20 is assembled to the motor case 10. At this time, the three bus bar terminals 53 that protrude from one end of the bus bar holder 411 penetrate through the respective holes of the motor cover 20.

The terminals 55 that are connected to the electric wires 54, corresponding to the respective phases, are provided on the motor cover 20. The motor cover 20 is engaged to the motor case 10, and thereafter, the bus bar terminals 53 are welded to one ends of the terminals 55.

When the motor 400 is operating, a driving current is supplied to the respective electromagnetic coils 43 via the electric wires 54, the terminals 55, and the bus bars 50, and the rotor 30 is rotated by magnetic force generated in the stator core 41.

The following effects can be obtained by the above-described embodiment.

As the claw parts 415 of the tip end parts 414 of the extending parts 412, formed on the bus bar holder 411 and engaged with the engaged parts 421 of the stator coils 42, are formed to protrude in the circumferential direction, it is possible to reduce the size of the bus bar holder 411 as compared with the case where the claw parts 415 protrude from the tip end parts 414 to the outer peripheral side or to the inner peripheral side. This makes it possible to reduce the radial dimension of the bus bar unit 410.

In addition, the claw parts 415 do not protrude from the recessed parts 422 of the insulator 420 to the inner peripheral side, and therefore the number of windings or the coil diameter of the electromagnetic coils 43 can be increased, without increasing the diameter of the insulator 420. Thus, the performance of the motor 400 can be improved.

Next, a fifth embodiment will be explained.

Figure 9:
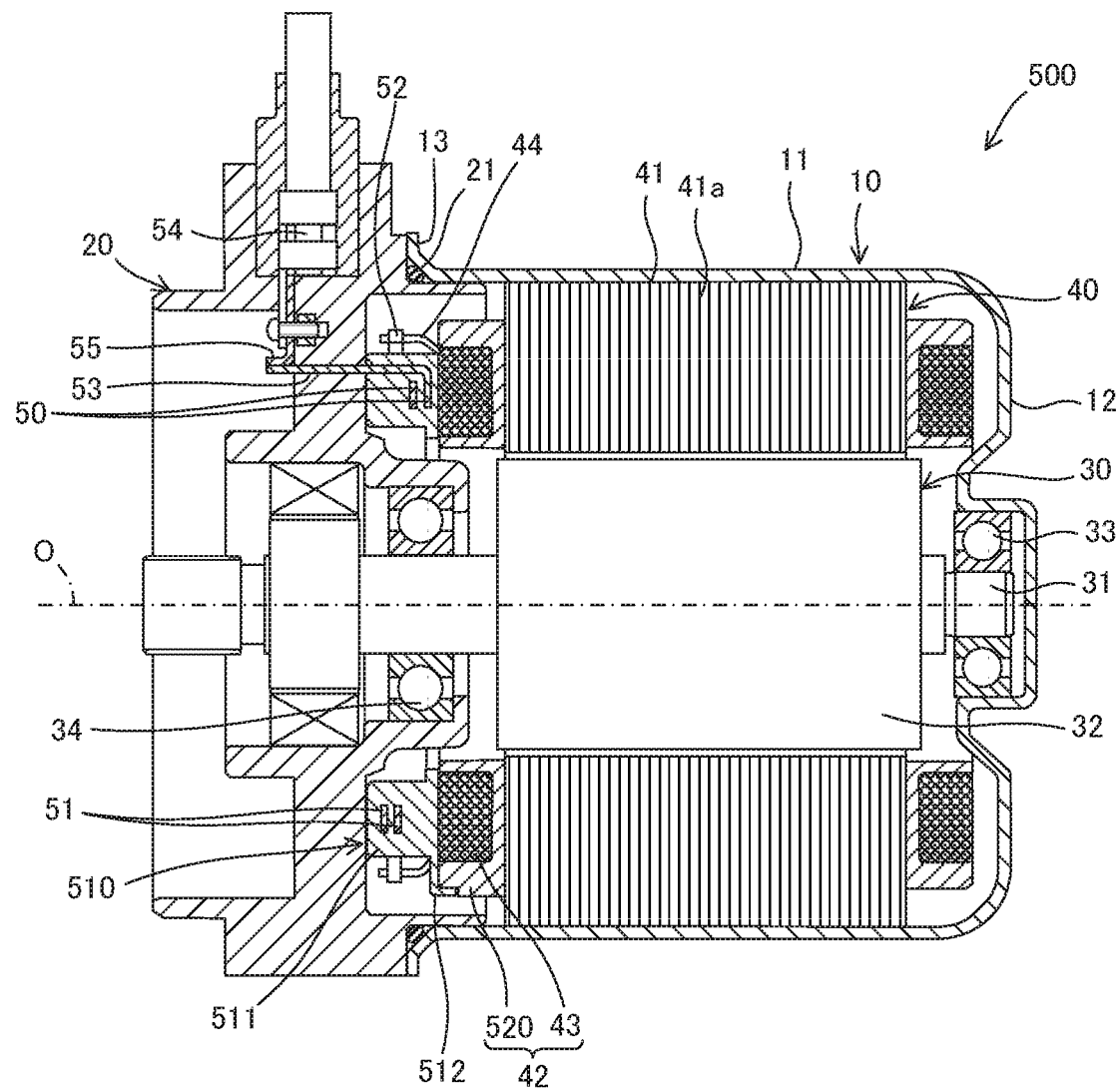
FIG. 9 is a cross-sectional view of a motor having a bus bar unit according to a fifth embodiment of the present invention.
Figure 10:
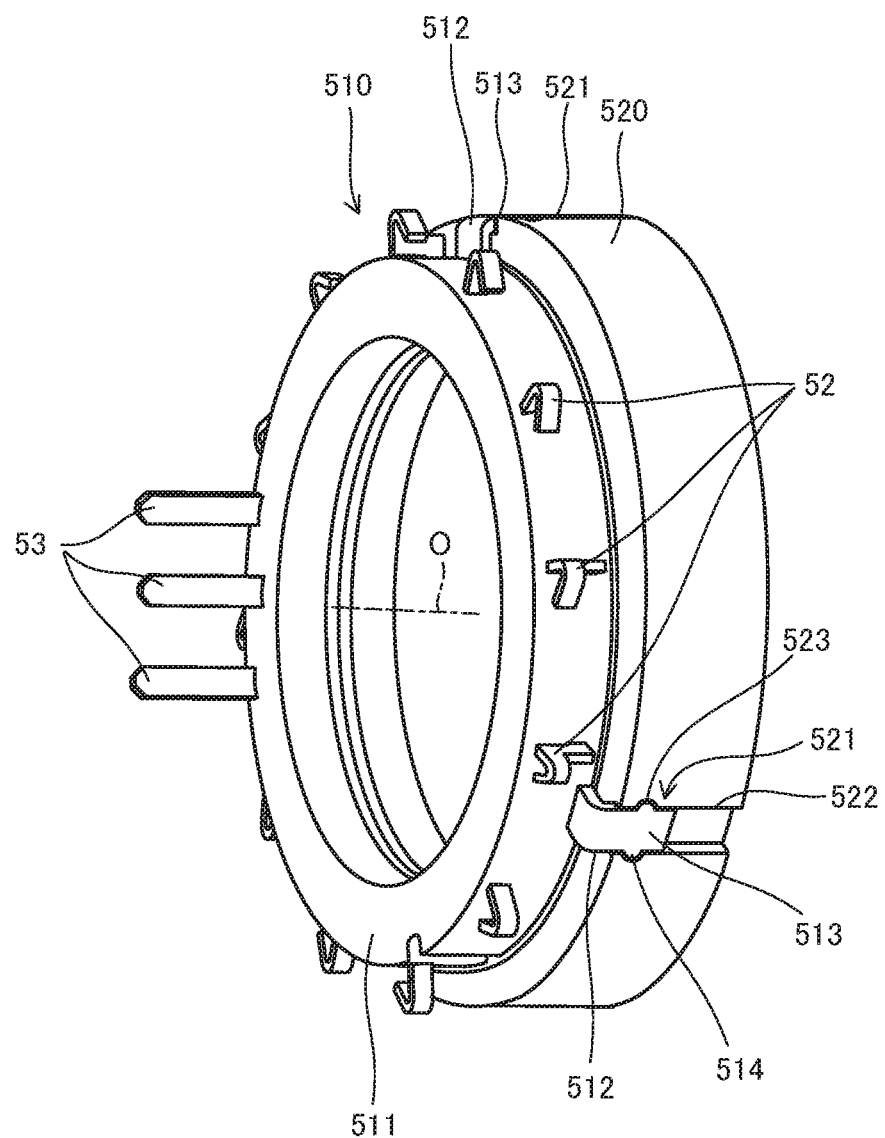
FIG. 10 is a perspective view of the bus bar unit according to the fifth embodiment of the present invention.

FIG. 9 is a cross-sectional view of a motor 500 on which a bus bar unit 510 according to this embodiment is mounted. FIG. 10 is a perspective view of the bus bar unit 510 according to this embodiment. In the following explanation, differences from the fourth embodiment are mainly explained, same reference numerals and symbols are given to designate the same structures as those of the motor 400 according to the fourth embodiment, and explanations thereof are omitted.

This embodiment is different from the fourth embodiment in the structure of engaging a bus bar holder 511 and an insulator 520.

On a tip end part 513 of each extending part 512 of the bus bar holder 511, a protrusion part 514 that serves as an engaging part and that is formed to protrude on both sides in the circumferential direction is provided. The bus bar holder 511 engages with the stator coils 42 as the tip end parts 513 of the plurality of extending parts 512 engage with engaged parts 521 in the outer periphery of the insulator 520.

The engaged parts 521, with which the tip ends of the extending parts 512 engage, are formed in the outer periphery of the insulator 520. Three engaged parts 521 are arranged at almost equal intervals along the circumferential direction, for the engagement of the tip end parts 513 of the extending parts 512. Each engaged part 521 includes a recessed part 522 that is formed to be recessed from the outer peripheral surface of the insulator 520, and a locking part 523 that is formed on the recessed part 522 on the side of the bus bar holder 511 and that has the greater width, in the circumferential direction, than that of the recessed part 522. The shape of the locking part 523 is set to be similar to that of the protrusion part 514 of the tip end part 513 of the extending part 512.

The bus bar holder 511 is positioned with respect to the stator coils 42, as the tip end parts 513 of the extending parts 512 engage by the snap-fitting with the locking parts 523. At this time, the tip end part 513 of each extending part 512 moves in the axial direction while being bent toward the outer side in the radial direction, and the protrusion part 514 is fitted to the locking part 523 when the protrusion part 514 of the tip end part 513 agrees with the locking part 523. It should be noted that the shape of the protrusion part 514 may be any shape, such as a semicircular shape or a rectangular shape, as long as the shape is similar to that of the locking part 523.

Thereby, the bus bar holder 511 is positioned with respect to the stator coils 42 in the radial direction and in the circumferential direction, arranged coaxially with the stator coils 42, and held at the predetermined rotational position.

The following effects can be obtained by the above-described embodiment.

As the protrusion parts 514 of the tip end parts 513 of the extending parts 512, formed on the bus bar holder 511 and engaged with the engaged parts 521 of the stator coils 42, are formed to protrude in the circumferential direction, it is possible to reduce the size of the bus bar holder 511 as compared with the case where the protrusion parts 514 protrude from the tip end parts 513 to the outer peripheral side or to the inner peripheral side. This makes it possible to reduce the radial dimension of the bus bar unit 510.

In addition, the protrusion parts 514 do not protrude from the recessed parts 522 of the insulator 520 to the inner peripheral side, and therefore the number of windings or the coil diameter of the electromagnetic coils 43 can be increased, without increasing the diameter of the insulator 520. Thus, the performance of the motor 500 can be improved.

Embodiments of this invention were described above, but the above embodiments are merely examples of applications of this invention, and the technical scope of this invention is not limited to the specific constitutions of the above embodiments.

According to the first embodiment, for example, the positioning step parts 112 of the bus bar holder 111 are provided on the outer peripheral side of the bus bar holder 111, but the positioning step parts 112 may be provided on the inner peripheral side of the bus bar holder 111. In this case, the extending parts 121 of the insulator 120 that are engaged by the snap-fitting with the positioning step parts 112 may also be provided similarly on the inner peripheral side.

Further, according to the first embodiment, the positioning step parts 112 are formed integrally with the bus bar holder 111, but the positioning step parts 112 may be formed by separate members.

Furthermore, the second embodiment illustrates such a case that the plurality of extending parts 221 of the insulator 220 engage by the snap-fitting with the corner part 212 at the position where the end surface of the bus bar holder 211, on the side opposite to the insulator 220 in the axial direction, crosses the outer peripheral surface of the bus bar holder 211. However, it may be engaged, by the snap-fitting, with a corner part where the end surface of the bus bar holder 211, on the side opposite to the insulator 220 in the axial direction, crosses the inner peripheral surface of the bus bar holder 211. In this case, the extending parts 221 of the insulator 220 may be provided to extend to the inner peripheral side of the bus bar holder 211.

Further, the third embodiment illustrates such a case that the protrusion parts 322 of the extending parts 321 of the insulator 320 engage by the snap-fitting with the recessed parts 312 formed in the outer peripheral surface of the bus bar holder 211. However, the recessed parts may be formed in the inner peripheral surface of the bus bar holder 211. In this case, the extending parts 321 of the insulator 320 may be arranged to extend to the inner peripheral surface of the insulator 320, and the protrusion parts 322 may be formed to protrude toward the outer peripheral side of the extending parts 321.

Furthermore, according to the fourth embodiment, the claw parts 415 of the extending parts 412 are caused to protrude on both sides in the circumferential direction, but the claw parts 415 may be caused to protrude in either one direction only.

Further, according to the fourth and the fifth embodiments, the extending parts 412, 512 of the bus bar holders 411, 511 are engaged with the engaged parts 421, 521 formed in the outer peripheral surface of the insulators 420, 520, but the engaged parts 421, 521 may be formed in the inner peripheral surface of the insulators 420, 520. In this case, the extending parts 412, 512 of the bus bar holders 411, 511 may be formed to extend toward the inner peripheral surface of the insulators 420, 520.

Furthermore, all the above-described embodiments illustrate the motors 100, 200, 300, 400, and 500 that generate power by electric power, but the above-described embodiments can be applied to generators that generate the electric power by the power.

Further, the above-described embodiments illustrate the bus bar units 110, 210, 310, 410, 510, in which the bus bars 50 are formed by punching its shape in a plate-shaped conductive member, the shape having the predetermined width and corresponding to the circumferential direction of the stator 40, and the respective bus bars 50 are laminated with the predetermined spaces therebetween in the axial direction. Instead, the bus bar unit may be formed in such a manner that the bus bars are formed by bending a linear belt-shaped conductive member in the plate thickness direction, so as to have the shape corresponding to the circumferential direction of the stator 40, and, by changing respective diameters of the bus bars, the plurality of bus bars are housed in the insulating holder.

The invention claimed is:

1. A rotary electric machine, comprising:
a rotor pivotally supported to be able to rotate;
a stator arranged on an outer periphery of the rotor with a space therebetween, the stator having a coil wound therearound; and
a bus bar unit including:
   a bus bar for energizing the coil wound around the stator, and
   a bus bar holder, formed by an insulating member, for holding the bus bar;
wherein the stator comprises
   a stator core having a plurality of teeth parts radially extending in a radial direction of the stator,
   an insulator surrounding the teeth parts, the insulator having an engaged part formed therein, the engaged part including
      a recessed part that is formed at a cylindrical outer peripheral surface of the stator, the recessed part being disposed between two ends of the insulator in an axial direction of the stator, and
      a locking part that is formed on the recessed part, the locking part having a width in a circumferential direction of the insulator smaller than a width of the recessed part, and
   the coil wound around the teeth parts via the insulator, and
wherein the bus bar holder includes
   an extending part extending toward the stator in the axial direction of the stator, and
   an engaging part formed to protrude from the extending part in a circumferential direction of the bus bar holder, for engaging with the engaged part of the stator.

2. The rotary electric machine according to claim 1,
wherein a notch is formed at a tip of the extending part,
wherein the engaging part is formed to protrude on both
   sides in a circumferential direction of the stator, with
   the notch therebetween, and
wherein the engaging part engages with the engaged part
   of the stator as the engaging part bends toward a side
   of the notch.

* * * * *